US012618444B2

(12) United States Patent
    Shahin et al.

(10) Patent No.: US 12,618,444 B2
(45) Date of Patent: May 5, 2026

(54) ROTATION ASYMMETRIC BRAKE DRUM FOR A DRUM BRAKE OF A MOTOR VEHICLE

(71) Applicant: HL MANDO CORPORATION, Pyeongtaek-si (KR)

(72) Inventors: Hatem Shahin, Pfaffenhofen (DE); Kai Braun, Friedrichsdorf (DE); Lothar Wagner, Simmern (DE)

(73) Assignee: HL MANDO CORPORATION, Pyeongtaek-si (KR)

( * ) Notice: Subject to any disclaimer, the term of this patent is extended or adjusted under 35 U.S.C. 154(b) by 377 days.

(21) Appl. No.: 18/198,551

(22) Filed: May 17, 2023

(65) Prior Publication Data

US 2023/0375056 A1    Nov. 23, 2023

(30) Foreign Application Priority Data

May 18, 2022    (DE) .......................... 102022204951.9

(51) Int. Cl.
    *F16D 65/10*    (2006.01)
    *B33Y 80/00*    (2015.01)
(52) U.S. Cl.
    CPC .............. *F16D 65/10* (2013.01); *B33Y 80/00* (2014.12); *F16D 2250/00* (2013.01)
(58) Field of Classification Search
    CPC ................. F16D 65/10; F16D 65/0006; F16D 2065/1304; F16D 2065/1312–1332; F16D 69/00–2069/0491; F16D 2250/00; B33Y 80/00
    See application file for complete search history.

(56) References Cited

U.S. PATENT DOCUMENTS

| | | | | | |
|---|---|---|---|---|---|
| 2,025,873 | A | * | 12/1935 | Lane | F16D 65/10 188/218 R |
| 5,782,324 | A | * | 7/1998 | Wall | B22D 19/00 188/218 R |
| 5,957,249 | A | | 9/1999 | Yamazaki | |
| 2006/0027429 | A1 | * | 2/2006 | Knight | F16D 65/10 188/74 |

FOREIGN PATENT DOCUMENTS

| | | | | |
|---|---|---|---|---|
| DE | 102009034043 | A | 3/2010 | |
| EP | 1178235 | A2 * | 2/2002 | .......... F16D 69/027 |
| GB | 775237 | A | 5/1957 | |
| JP | 10-26153 | A | 1/1998 | |
| KR | 10-0369059 | B1 | 1/2003 | |
| KR | 10-2005-0022495 | A | 3/2005 | |

OTHER PUBLICATIONS

Office Action of the corresponding German family application.

* cited by examiner

*Primary Examiner* — David R Morris
(74) *Attorney, Agent, or Firm* — Harvest IP Law, LLP

(57)    ABSTRACT

A brake drum for a drum brake of a motor vehicle, the brake drum having:
  a ring section extending concentrically about a rotation axis; and
  a circular wall section extending at an angle to the rotation axis;
wherein in the brake drum has at least one portion that deviates from at least one of:
  a) a rotation symmetric configuration of the brake drum with respect to the rotation axis;
  b) a material comprised by at least one other portion of the brake drum.

8 Claims, 24 Drawing Sheets

ROTATION ASYMMETRIC BRAKE DRUM FOR A DRUM BRAKE OF A MOTOR VEHICLE

CROSS-REFERENCE TO RELATED APPLICATION

This application is based on and claims priority under 35 U.S.C. § 119 to German Patent Application No. 102022204951.9, filed on May 18, 2022 in the German Patent and Trade Mark Office, the disclosures of which are incorporated herein by reference.

TECHNICAL FIELD

The invention concerns a brake drum for a drum brake of a motor vehicle, such as a car, a truck or a bus.

BACKGROUND

Drum brakes are an established braking technology for motor vehicles. They typically comprise a brake drum having a contact surface at an inner circumferential face and a backing plate carrying brake shoes which have a friction lining for contacting the contact surface. An example can be found in KR 2006 006 3092 A.

There remains room for improvement with respect to noise generation of existing drum brakes. For example, it has been determined that brake drums can significantly contribute to generating and/or to spreading vibrations which are perceivable as acoustic noise.

SUMMARY

It is therefore an object of this invention to improve the brake drum for a drum brake of a motor vehicle with respect to its vibration characteristics and in particular its potential for noise generation.

This is object is achieved by a brake drum and a method according to the independent claims.

Accordingly, a brake drum for a drum brake of a motor vehicle is disclosed, the brake drum having:
- a ring section extending concentrically about a rotation axis; and
- a circular wall section extending at an angle to the rotation axis;

wherein in the brake drum has at least one (e.g. first) portion that deviates from at least one of:
- a) a (e.g. otherwise or predominantly) rotation symmetric configuration of the brake drum with respect to the rotation axis;
- b) a material comprised by at least one other (e.g. second) portion of the brake drum, said other portion e.g. being the ring section or the wall section.

Terms such as axial, radial and circumferential used herein may relate to the rotation axis. An axial direction may extend along said axis, a radial direction may extend orthogonally thereto and a circumferential direction may extend about said axis.

With option a) and b) above, the disclosed brake drum has further design parameters compared to existing designs which may help to limit vibrations and thus the level of generated noise.

According to option a), the brake drum is rotation symmetric apart from the at least one portion. Put differently, the brake drum would be completely rotation symmetric if the at least one portion was not provided (and the brake drum was instead configured at said portion similarly to its adjacent portions). Accordingly, the at least one portion may render the brake drum rotation asymmetric and/or define a rotation asymmetric portion thereof.

The rotation asymmetry may in particular include that there is only one rotational angle (in particular a rotation angle of 360°, i.e. a full turn) at which the brake drum may resemble its pre-rotation shape and/or configuration. Accordingly, the rotation asymmetry may exclude designs having a number of distinct partial turns each marked by rotational angles of less than 360° and each resulting in the brake drum resembling its pre-rotation shape and/or configuration. Such partial turns could e.g. be defined by distributing local shape deviations at regular angular distances from one another along the brake drum's circumference.

By providing the rotation asymmetry, the eigenfrequencies of the brake drum can be more clearly set apart from eigenfrequencies of components mechanically coupled thereto, e.g. from axle components or other brake components. Further and e.g. depending on a position of the at least one portion, this may allow for the eigenfrequencies of different sections of the brake drum (in particular of the ring section and wall section) to be clearly separated.

Separating the eigenfrequencies limits the propagation of vibrations and thus the level of generated noise. Put differently, this way the extent to which the brake drum acts as a source of vibration can be limited.

According to option b), the brake drum may comprise at least one portion having a first material and at least one other portion having a deviating second material. Said other portion may comprise the remainder of the brake drum or a majority thereof, e.g. in terms of volume or weight. This too helps to separate eigenfrequencies between different sections of the brake drum. Also, this may help to limit the brake drum acting as a responsive member with respect to vibrations, thus limiting the level of noise emitted by the brake drum into the surroundings. The latter concerns in particular embodiments in which the deviating material is arranged at or near a surface of the brake drum.

The brake drum may be an integral member or, differently put, a one-piece member. Especially in case of option b), it may be a multi-piece member, wherein the at least one portion may be comprised by one of its members. On the other hand, in particular when applying an additive manufacturing technology, the at least one portion may be a one-piece integral portion of the brake drum in which a deposited or solidified material deviates from a material of the remainder of the brake drum.

The ring section may extend concentrically to and/or about the rotation axis. It may be circular. It may define a cylindric section, in particular a cylinder mantel surface or cylinder jacket (e.g. a cylinder without base surfaces). The ring section may define an outer and/or inner circumferential face of the brake drum, wherein any of said faces e.g. extends about the rotation axes. A contact surface for being contacted by a brake shoe may be formed at an inner circumferential face of the ring section. The ring section may define a largest diameter of the brake drum.

The wall section may be plate-shaped and/or may be substantially planar. It may extend orthogonally to the rotation axis. It may merge with and/or into the ring section. The ring section may extend orthogonally to the wall section. The wall section may extend concentrically with respect to the rotation axis.

The wall section may comprise a connection portion for connecting the brake drum to an axle component and/or to a vehicle wheel. The brake drum may thus generally be configured to rotate jointly with the axle component and/or the vehicle wheel. The connection portion may be a hub portion. It may comprise a least one through-hole, e.g. for receiving a mechanical fixing element (e.g. a bolt). The connection portion may be positioned at and/or may comprise a geometric center of the wall section. It may be intersected by the rotation axis.

The wall section may form a base surface of a cylinder, the mantle of which is formed by the ring section. The brake drum may be formed as a cylinder that is open to one side, e.g. by missing a base surface opposite to the wall section.

According to a further embodiment, the at least one portion according to option a) is comprised by one of the ring section and the wall section, wherein the respective other one of the ring section and wall section is rotation symmetric. The enables a particularly effective separation of eigenfrequencies between the wall section and ring section.

In one example, both of the ring section and the wall section each have a portion according to option a), said portions being different from one another in terms of at least one dimension and/or in terms of their circumferential position. In this case, both of the ring section and the wall section may be rotation asymmetric. However, their rotation asymmetry may differ due to the different dimension and/or position of their respective rotation asymmetric portions. Thus, the eigenfrequencies of the wall section and ring section may be reliably separated from the eigenfrequencies of adjacent components as well as from the eigenfrequencies of the respective other of the wall section and ring section. This provides a particularly effective vibration suppression.

Generally, by way of the rotation asymmetry e.g. provided by option a), a difference in eigenfrequencies between the ring section and wall section is defined and/or is increased.

According to a further example, the deviation from the rotation symmetry according to option a) is defined by at least one local structural deviation, in particular a recess, an added mass, a cavity or a change in material strength (e.g. a local increase/stiffening or decrease/weakening of the brake drum's material) of the brake drum's material. The recess, the added mass and the change in material strength may also be referred to as shape deviations. Accordingly, a rotation asymmetry may be caused or may be defined by the recess, the added mass, the cavity or the change in material strength.

The added mass may be a projection or protrusion or generally define a deviation from a basic shape of the wall section (e.g. a plate shape) or of the ring section (e.g. a ring shape or cylinder mantle shape). When provided at the ring section, it may form a radial projection. When provided at the wall section, it may form an axial projection.

The added mass may act as a vibration damper or absorber, e.g. by at least locally increasing the mass of the brake drum. The added mass may be located at an outer circumferential face of the ring section or near a radially outer edge of the wall section. Both of these positions help to increase its lever arm with respect to the rotation axis.

The recess may be e.g. a circular, a rounded or a polygonal depression.

In one aspect, the rotation asymmetry is defined by at least three local structural deviations acting as respective portions according to option a), wherein each two adjacent local structural deviations are spaced apart by an angular distance and the angular distances between the local structural deviations are non-uniform. In other words, the local structural deviations are non-uniformly or irregularly distributed in a circumferential direction. This is a simple, yet effective way of defining the asymmetry.

According to a further example, the rotation asymmetry is defined by a plurality of local structural deviations, the local structural deviations being different from one another. In this case, the spacing or distribution of the structural deviations may be uniform, but the structural deviations may be different, e.g. differently sized and/or shaped. This likewise represents a simple, yet effective way of defining the rotation asymmetry.

According to a further embodiment that is based on option b), the at least one portion deviating in terms of material comprises one of the wall section or ring section. Accordingly, the wall section and the ring section may generally comprise a different material. This too allows for the wall section and the ring section to have different vibration characteristics, in particular in terms of their eigenfrequencies not overlapping one another.

According to another embodiment that is based on option b), the portion comprises at least one layer attached to at least one of the wall section or ring section. Said layer may comprise at least one cavity.

The material of the layer may be non-metallic. It may be different from the material of any of the wall section or ring section. It may be porous and/or at least three times as elastic as a material of the wall section or ring section, e.g. as defined by an E-modulus. Accordingly, the material may act as a vibration dampening and in particular noise dampening member. This may limit an amplitude of generated vibrations in particular in a radial direction.

The invention also concerns a method for producing a brake drum of a motor vehicle, the brake drum having:
   a ring section extending concentrically about a rotation axis; and
   a circular wall section extending at an angle to the rotation axis;
wherein the method includes producing at least one portion of the brake drum that deviates from at least one of:
   a) a rotation symmetry of the brake drum with respect to the rotation axis;
   b) a material comprised by a remainder of the brake drum.

The method may further include: producing the at least one portion by an additive manufacturing technology. The additive manufacturing technology may e.g. include a selective solidifying technology, such as selective laser melting, or a selective deposition technology. By means of additive manufacturing, the structural features disclosed herein may be produced particularly efficiently and accurately. Portions having a deviating material may be produced by additive manufacturing as well e.g. by locally varying a deposited or solidified material. It may also be possible to produce e.g. the wall and ring section separately by additive manufacturing (or any other manufacturing technology) and to subsequently join the wall section and ring section to form the drum brake.

The method may comprise any further measures or steps to produce a brake drum according to any of the configurations disclosed herein.

BRIEF DESCRIPTION OF DRAWINGS

Embodiments of the invention are discussed below with respect to the attached schematic figures. Throughout the figures, same features may be marked with same reference signs.

DETAILED DESCRIPTION

Figure 1:
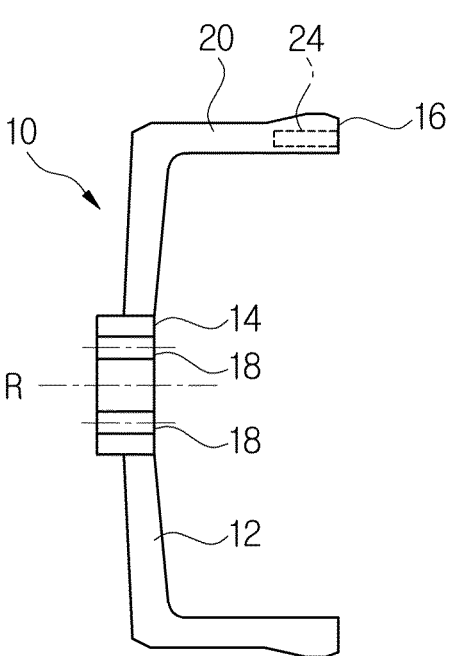
FIGS. 1-2 show a cross-sectional view (1) and front view (2) of a brake drum according to a first embodiment of the invention.
Figure 2:
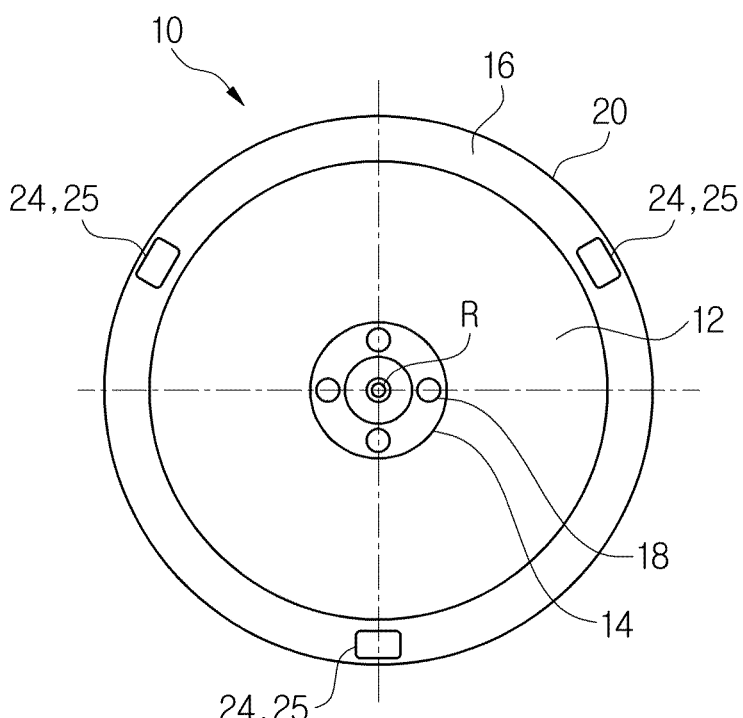

FIGS. 1 and 2 show a brake drum 10 according to a first embodiment of the invention. The brake drum 10 is configured to rotate about a rotation axis R. FIG. 1 a is a cross-sectional view of the brake drum 10 with the cross sectional plane including the rotation axis R. FIG. 2 is a front view of the brake drum 10 with the rotation axis R extending orthogonally to the image plane. The brake drum 10 is configured as a one-piece member having an homogeneous material structure.

The brake drum 10 comprises a circular wall section 12 that is a plate shaped an extends at an angle to the rotation axis R. For example, the wall section 12 extends at an angle of more than 60° or more than 80° to the rotation axis R and may substantially extend orthogonally to the rotation axis R.

At its geometric centre that is intersected by the rotation axis R, the wall section 12 comprises a connection portion 14 for connecting to an axle component. As an optional feature, the connection portion 14 comprises a number of off-centre through holes 18 for receiving mechanical fixing elements, such as bolts, for being secured to the axle component and/or to a vehicle wheel.

The brake drum 10 also comprises a ring section 20. The ring section is configured as a section of a cylinder mantle surface that is concentrically positioned with respect to and extends about the rotation axis R. The wall section 12 merges with the ring section 20 and extends at an angle thereto. Said angle may e.g. amount to at least 60° or more than 80° and/or the wall section 12 may substantially extend orthogonally relative to the ring section 20. The ring section 20 extends substantially axially.

At its inner circumferential face 22, the ring section 20 has an e.g. metallic contact surface for being contacted by a non-illustrated brake shoe to generate a braking effect. In a generally known manner, the brake shoe may be configured to carry a ring-shaped and non-illustrated friction lining that comprises a friction material.

The brake drum 10 comprises recesses 24 positioned in the ring section and extending axially inward from an axial end face 16 of the ring section 20. The recesses 24 each form a structural deviation from respectively adjacent or surrounding areas of the ring section 20 which are free of recesses (i.e. are massive).

As shown in FIGS. 1-2, the brake drum 10 is generally rotation symmetric with respect to the rotation axis R. This, however, does not apply to the recesses 24. Each of them thus forms a rotation asymmetric portion of the brake drum 10 that contributes to the overall rotationally non-symmetric design of the brake drum 10. Alternatively, the recesses 24 may be regarded jointly form a respective rotation asymmetric portion or pattern.

In more detail, the angular distances between the recesses 24 are nonuniform. For example, between the upper recesses 24 in FIG. 2, the angular distance is approximately 90°, wherein between the lower recess 24 and each of the upper recesses 24, the angular distance is about 135°.

Therefore, the brake drum 10 can only resemble or restore its shape and/or orientation of FIG. 2 if rotated by a full turn of the 360°. Any partial return of less than 360° results in the recesses 24 being distributed differently from and thus not reproducing the configuration in FIG. 2.

The recesses 24 are produced by an additive manufacturing technology. Yet, they could also be produced by metal casting or by a machining operation.

In the embodiment of FIGS. 1-2, the recesses 24 are only provided in the ring section 20. Therefore, only said ring section 20 is marked by a rotation asymmetry, whereas the wall portion 12 is rotation symmetric. As a result, the eigenfrequencies of the ring section 20 and of the wall portion 12 are reliably kept apart.

Figure 3:
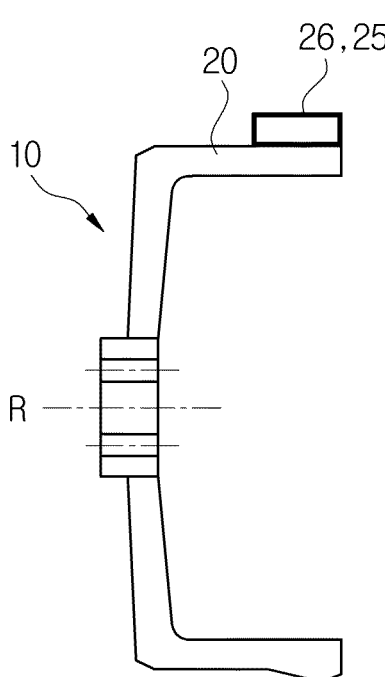
FIGS. 3-4 show a cross-sectional view (3) and front view (4) of a brake drum according to a second embodiment of the invention.
Figure 4:
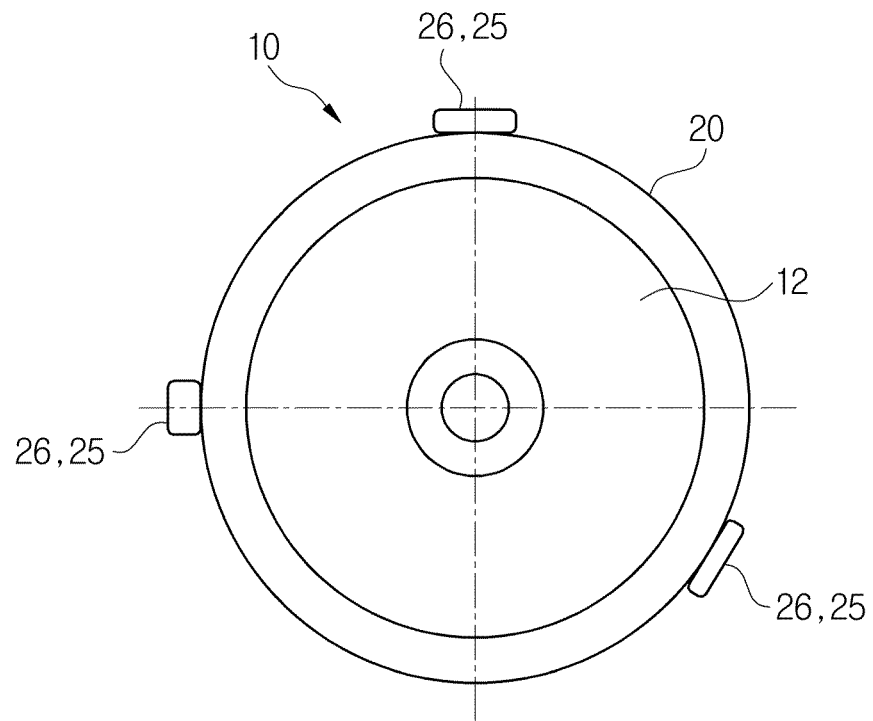

FIGS. 3-4 show an alternative embodiment in which the rotation asymmetry of the ring section 20 is achieved by positioning additional masses 26 at the ring section 20. These additional masses 26 form radial projections or radial protrusions of the brake drum 10.

Again, the additional masses 26 are distributed at irregular angular distances from one another. The uppermost and left additional mass 26 have an angular distance of 90° to one another and about 135° to the right additional mass 26. The additional masses 26 thus each form a rotation asymmetric portion 25 of the brake drum 10. As an exemplary option, the additional masses 26 are located at an outer circumferential face of the ring section 20. They may be joined thereto or integrally formed with the brake drum 10, in particular by an additive manufacturing technology.

Figure 5:
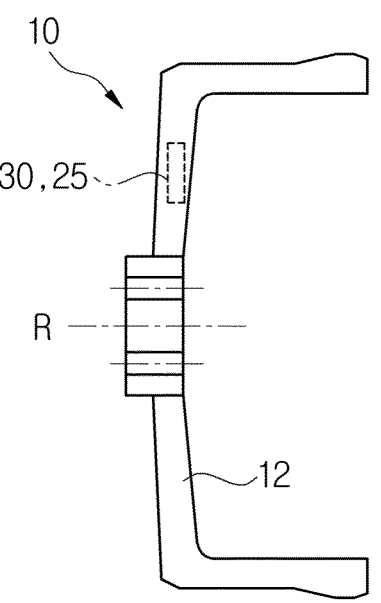
FIGS. 5-6 show a cross-sectional view (5) and front view (6) of a brake drum according to a third embodiment of the invention.
Figure 6:
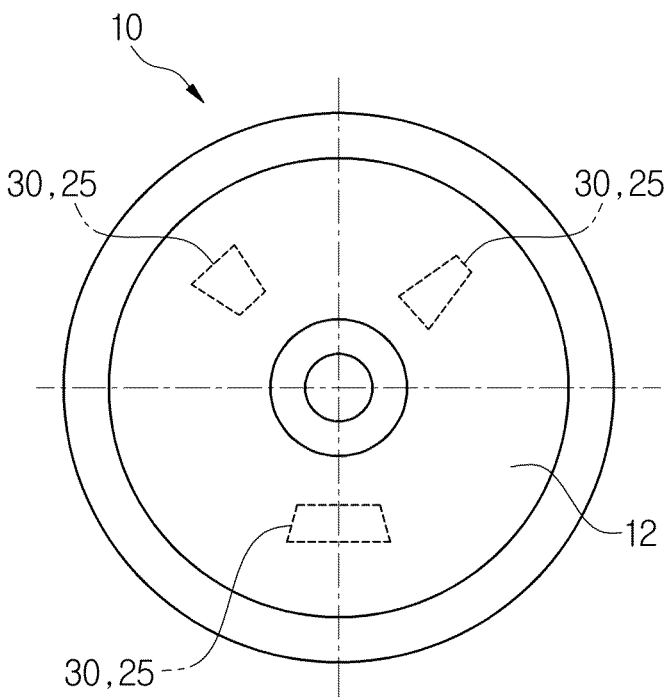

In FIGS. 5-6, the ring section 20 is rotation symmetric, but the wall section 12 is not. Specifically, the wall section 12 comprises a number of cavities 30 which, again, are non-uniformly spaced apart from one another in a circumferential direction. Accordingly, they each form a rotation asymmetric portion 25 of the brake drum 10.

Figure 7:
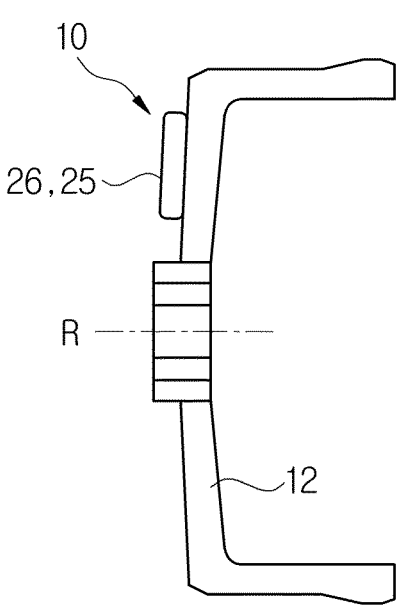
FIGS. 7-8 show a cross-sectional view (7) and front view (8) of a brake drum according to a fourth embodiment of the invention.
Figure 8:
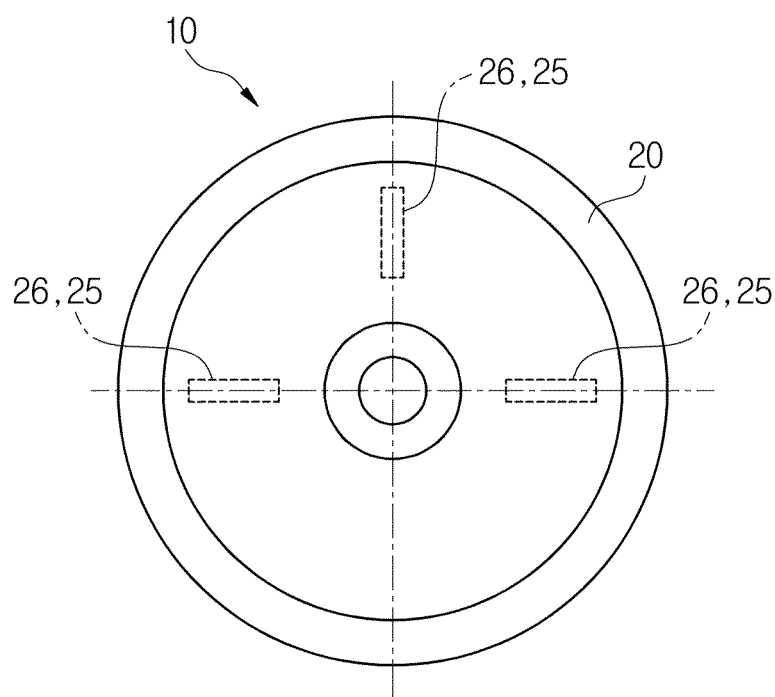

In FIGS. 7-8, the ring section 20 is rotation symmetric, but the wall section 12 is not due to comprising additional masses 26 at a rear face of the wall section 12. As shown in FIG. 8, the at least three additional masses 26 are irregularly spaced apart from one another by 90° and 180°. Accordingly, they each form a rotation asymmetric portion 25 of the brake drum 10.

Figure 9:
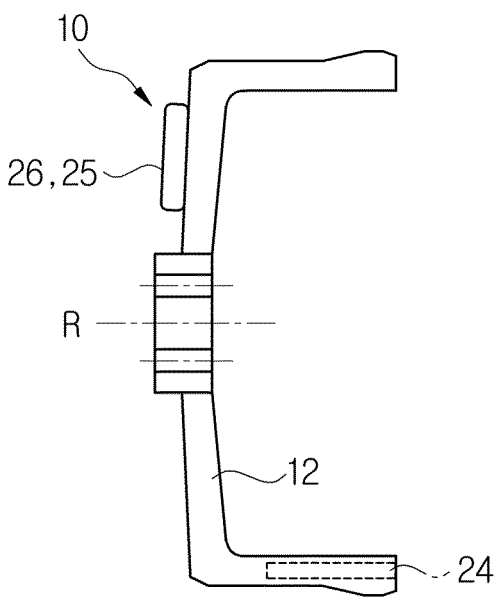
FIGS. 9-10 show a cross-sectional view (9) and front view (10) of a brake drum according to a fifth embodiment of the invention.
Figure 10:
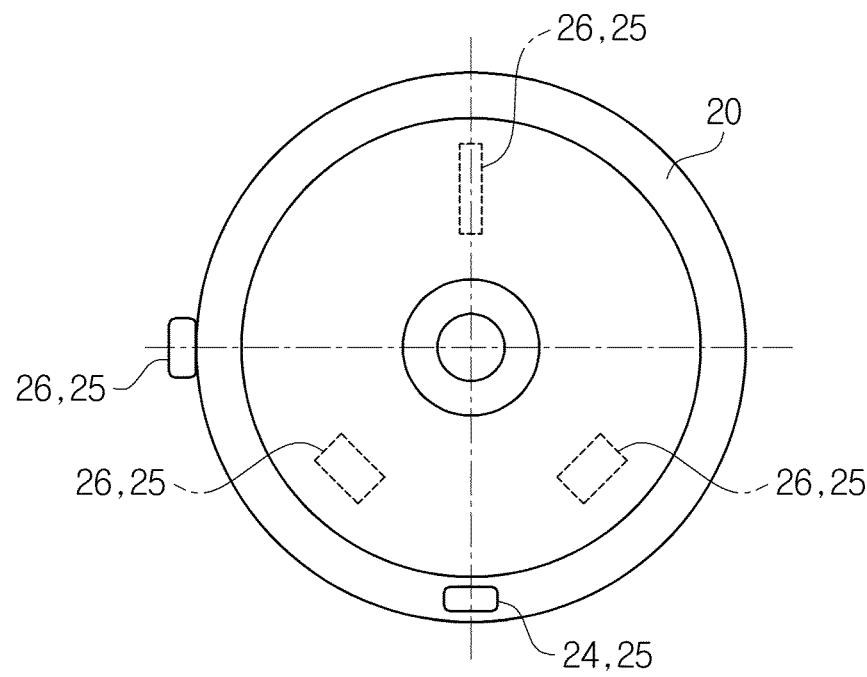
Figure 11:
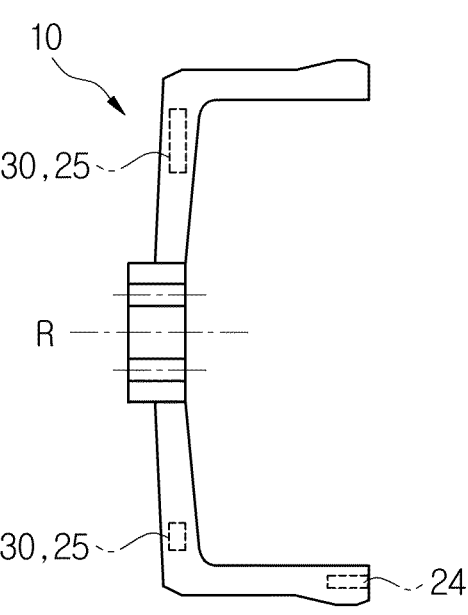
FIGS. 11-12 show a cross-sectional view (11) and front view (12) of a brake drum according to a sixth embodiment of the invention.
Figure 12:
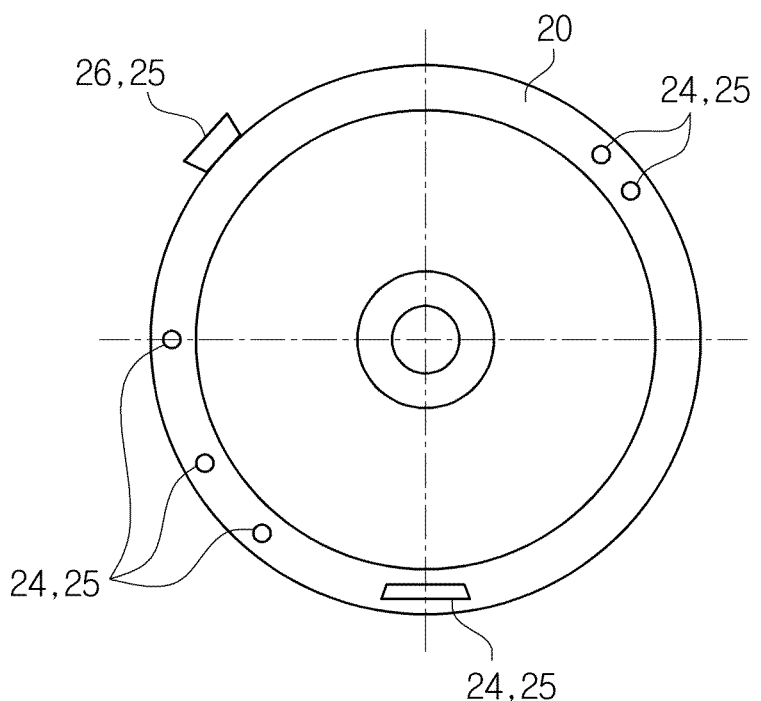

Generally, any of the depicted embodiments may be combined with one another. FIGS. 9-10 show an embodiment in which a configuration similar to FIGS. 7-8, FIGS. 1-2 and FIGS. 3-4 are combined. Accordingly, non-regularly distributed additional masses 26 at the wall section 12 are combined with a single additional masses 26 (or alternatively a non-regularly distributed plurality) at the ring section 20. Also, a single recess 24 (or alternatively a non-regularly distributed plurality) is provided at the ring section 20.

FIGS. 9-10 show an embodiment comprising a different combination of rotation asymmetric portions 25. Specifically, a number of non-uniformly shaped and distributed recesses 24 is provided at the ring section 20. Also, a single additional mass 26 (or alternatively a non-regularly distributed plurality) is provided at the ring section 20. Further, the wall section 12 comprises a number of irregularly distributed and/or irregularly sized cavities 30.

The embodiment of FIGS. 13-14 and FIGS. 15-16 (which may also be combined with one another or with any other embodiment disclosed herein) comprises portions 25 defining a rotational asymmetry by way of a varying material strength (or differently put a varying material thickness or wall thickness).

Figure 13:
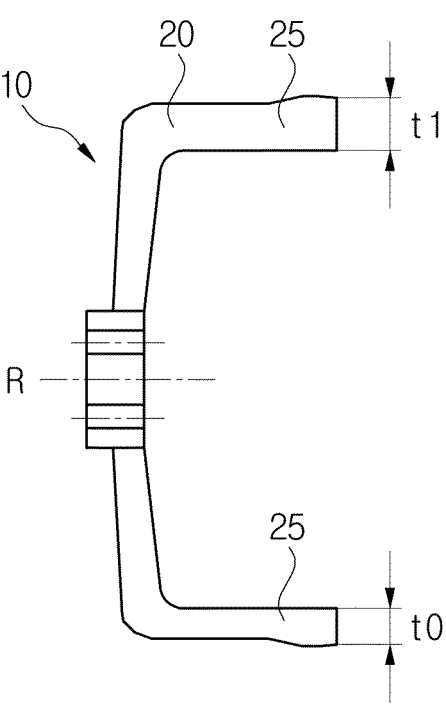
FIGS. 13-14 show a cross-sectional view (13) and front view (14) of a brake drum according to a seventh embodiment of the invention.
Figure 14:
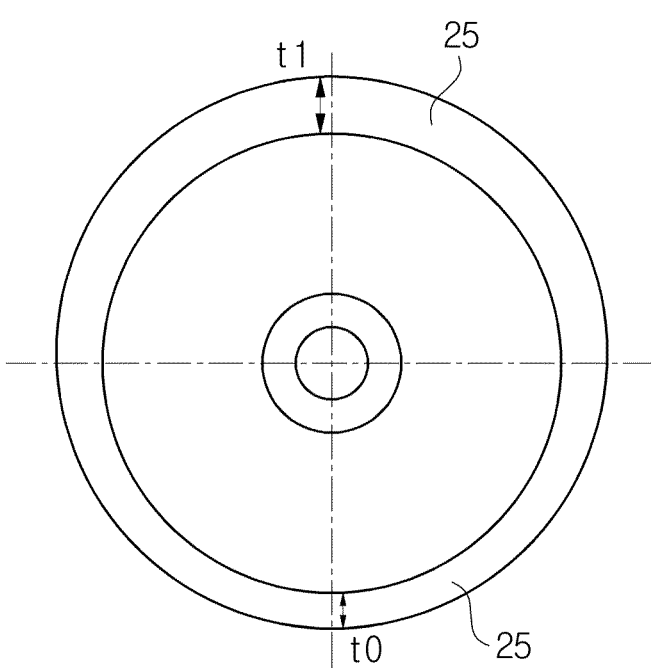

In case of FIGS. 13-14, the ring section 20 has a first reduced material strength t0 and a second enlarged material strength t1. These define a rotation asymmetry due to the ring section 20 thus having a respectively varying material strength along its circumferential direction, see FIG. 14. The wall section 12 has a continuous or at least not rotation asymmetrically distributed material strength. According to the illustration FIG. 14, the variation can be continuous, but does not have to be continuous. It could also be stepwise. For example, the upper and lower portions having the different strengths t1, t0 could be connected by a circumferential portion having a constant material strength.

Figure 15:
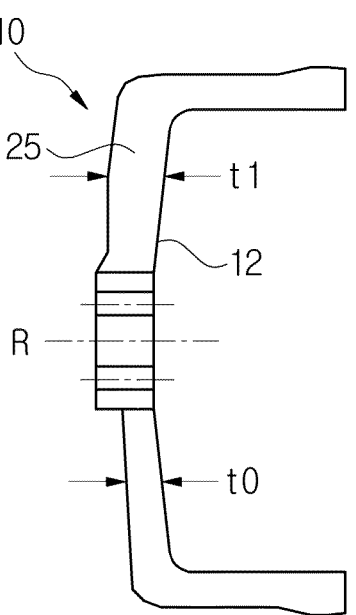
FIGS. 15-16 show a cross-sectional view (15) and front view (16) of a brake drum according to a eighth embodiment of the invention.
Figure 16:
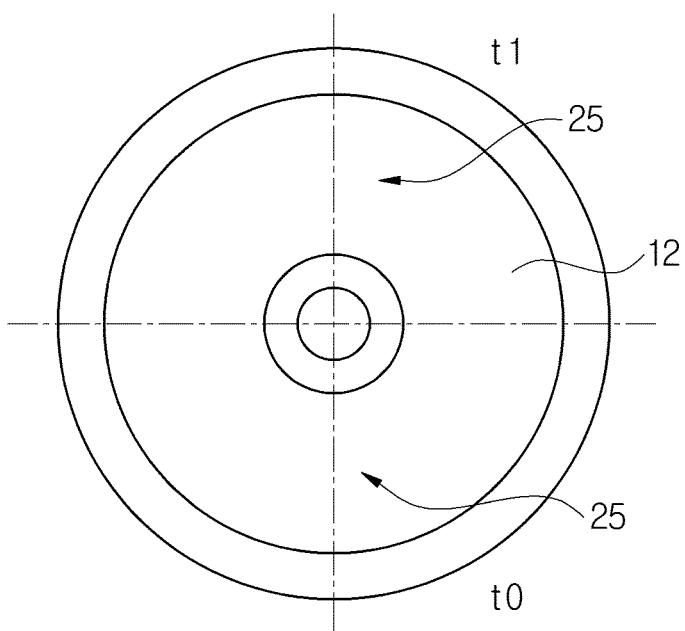

In FIGS. 15-16, the variation of material strengths is provided in the wall section 12. Again, this variation may occur continuously in a circumferential direction or in a stepwise manner. The ring section 20 has a continuous or at least a not rotation asymmetrically distributed material strength.

FIGS. 17-18, 19-20, 21-22, 23-24 each show brake drum designs having deviations with respect to material. Specifically, each of these embodiments comprises at least one portion 33 whose material differs from a material of at least one other portion of the brake drum 10 (e.g. a main portion in terms of weight or volume). In a particular, the material of said portion 33 may differ from the material of both of the wall section 12 and ring section 20. The embodiments of FIGS. 17-18, 19-20, 21-22, 23-24 may be combined with any of the previous embodiments or with one another.

In FIGS. 17-18, 19-20, 21-22, the material of deviation is provided by attaching a vibration dampening and noise absorbing layer 32 that is in particular made of a flexible and/or more elastic material compared to the wall section 12 and ring section 20. For example, the noise absorbing layer 32 may comprise a flexible foam material, whereas the remainder of the brake drum 10 comprises a metallic material. As an additional optional feature, said flexible layer 32 comprises cavities 30. These may be angularly distributed regularly or irregularly, the latter case thus defining a rotation asymmetric portion 25 as discussed above.

Figure 17:
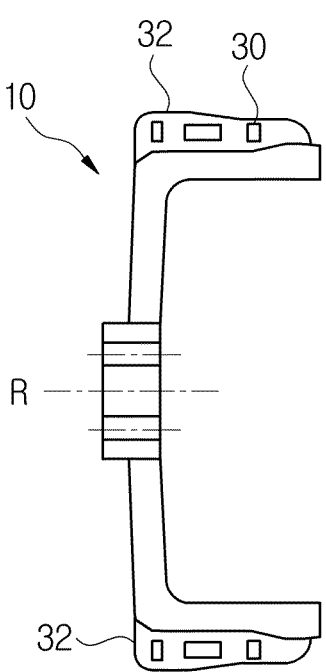
FIGS. 17-18 show a cross-sectional view (17) and front view (18) of a brake drum according to a ninth embodiment of the invention.
Figure 18:
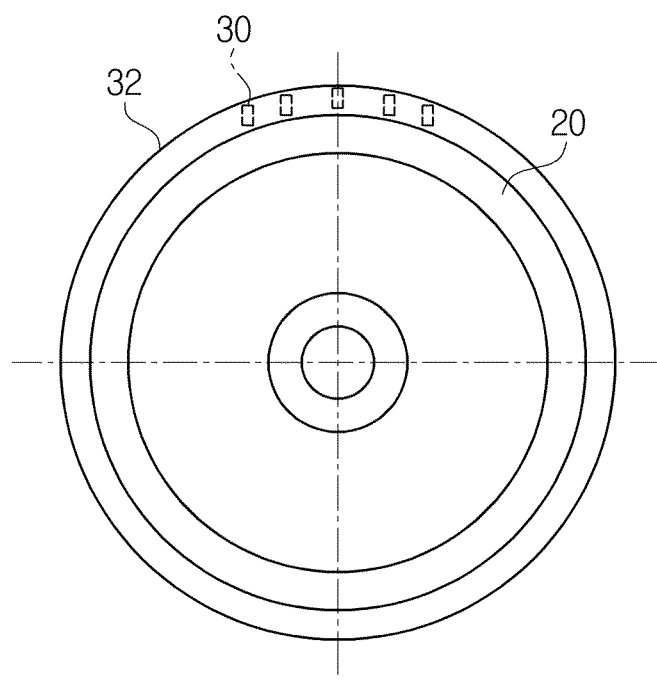

In FIGS. 17-18, the layer 32 is ring-shaped and attached to an outer circumferential face of the ring section 20. In FIG. 18 a circumferential position of selected cavities 30 is indicated.

Figure 19:
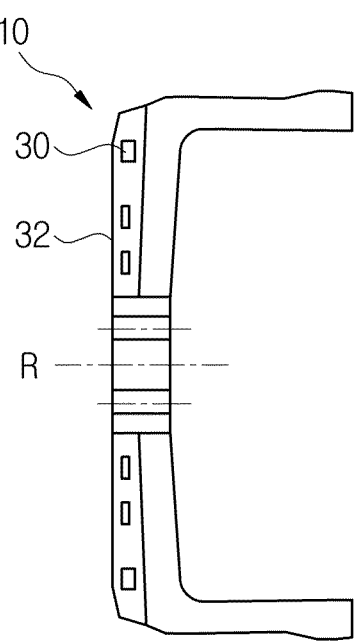
FIGS. 19-20 show a cross-sectional view (19) and front view (20) of a brake drum according to a tenth embodiment of the invention.
Figure 20:
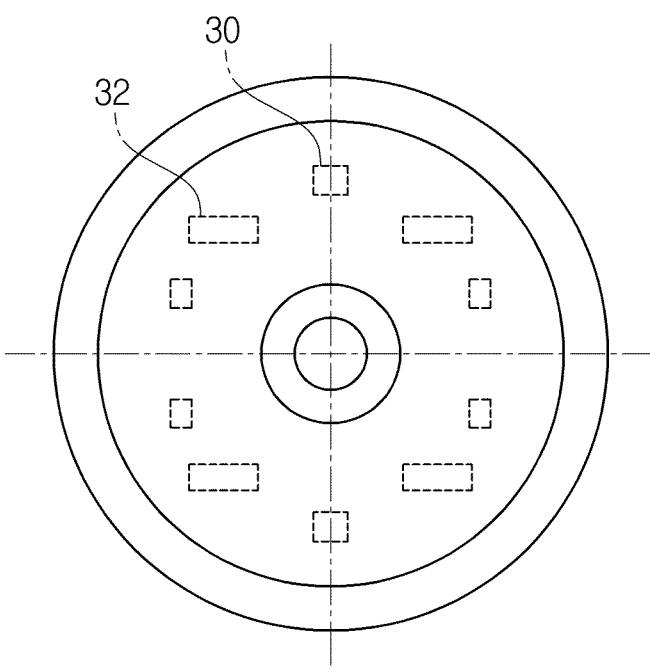

In FIGS. 19-20, the layer 32 is plate-shaped and attached to a rear face of the wall section 12. At its geometric centre portion, the layer 32 optionally receives the connection portion 14. As a mere example, the layer 32 comprises cavities 30, an arrangement thereof being indicated in FIG. 2.

Figure 21:
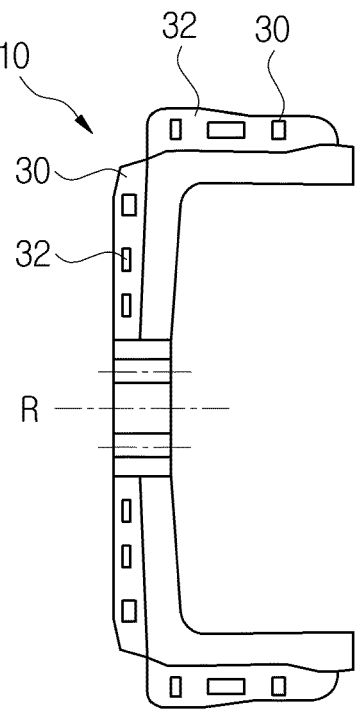
FIGS. 21-22 show a cross-sectional view (21) and front view (222) of a brake drum according to a eleventh embodiment of the invention.
Figure 22:
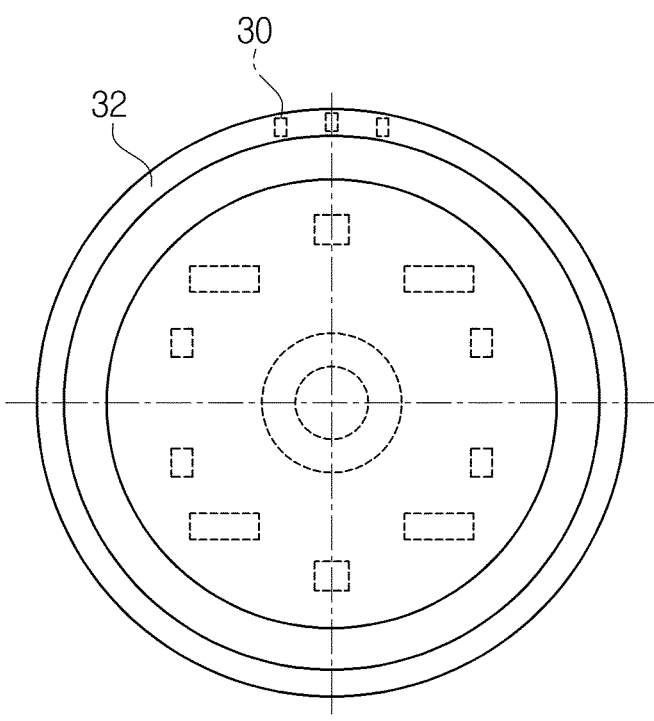

In FIGS. 21-22, the embodiments of FIGS. 17-18 and FIGS. 19-20 are combined.

Figure 23:
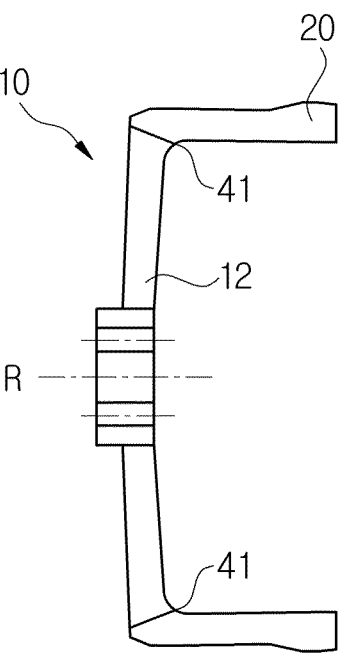
FIGS. 23-24 show a cross-sectional view (23) and front view (24) of a brake drum according to a twelfth embodiment of the invention.
Figure 24:
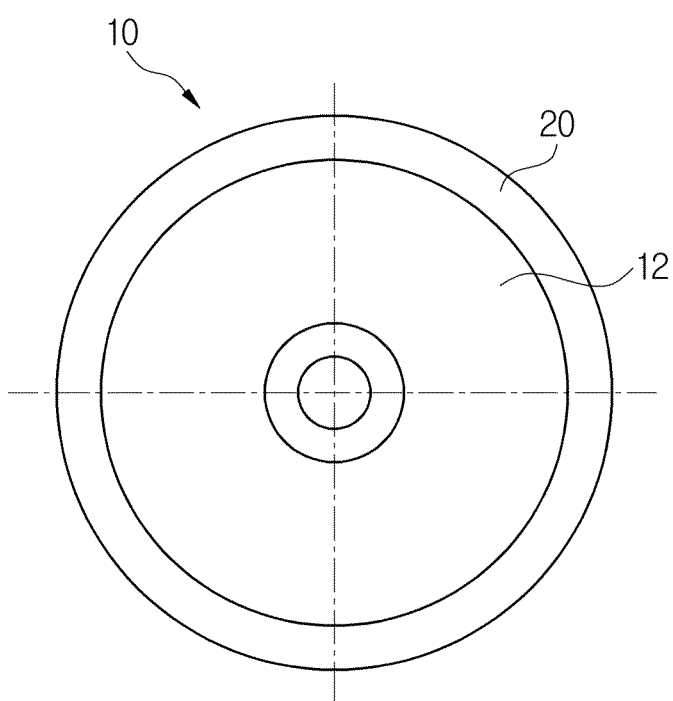

In FIGS. 23-24, the material deviation includes that the wall section 12 and the ring section 20 are configured of a different material and joined along a joining face 41.

What is claimed is:

1. A brake drum for a drum brake of a motor vehicle, the brake drum having:
   a ring section extending concentrically about a rotation axis; and
   a circular wall section extending at an angle to the rotation axis;
   wherein the brake drum has at least one portion such that the brake drum itself is rotation asymmetric with respect to the rotation axis, and
   wherein the at least one portion deviates from
   a rotation symmetric configuration of the brake drum with respect to the rotation axis;
   wherein the at least one portion comprises at least one recess extending axially inward from an axial end face of the ring section, and
   wherein the at least one recess is positioned rotation asymmetric with respect to the rotation axis.

2. The brake drum according to claim 1,
   wherein the at least one portion is comprised by one of the ring section and the wall section, wherein the respective other one of the ring section and wall section is rotation symmetric.

3. The brake drum according claim 1,
   wherein both of the ring section and the wall section each have a portion, said portions being different from one another in terms of at least one dimension and/or in terms of their circumferential position.

4. The brake drum according to claim 1,
   wherein, by way of the rotation asymmetry, a difference in eigenfrequencies is defined and/or is increased between the ring section and wall section.

5. The brake drum according to claim 1,
   wherein the deviation from the rotation symmetry is defined by the at least one recess.

6. The brake drum according to claim 5,
   wherein at least three recesses are provided that are non-uniformly distributed in a circumferential direction.

7. Method for producing brake drum for a drum brake of a motor vehicle,
   the brake drum having:
   a ring section extending concentrically about a rotation axis; and
   a circular wall section extending at an angle to the rotation axis;
   wherein the method includes producing at least one portion of the brake drum such that the brake drum itself is rotation asymmetric with respect to the rotation axis, and
   wherein the at least one portion deviates from a rotation symmetric configuration of the brake drum
    with respect to the rotation axis, wherein the at least one portion comprises at least one
    recess extending axially inward from an axial end face
    of the ring section, and wherein the at least one recess is positioned rotation
    asymmetric with respect to the rotation axis.

8. Method according to claim 7, including: producing the at least one recess by an additive
    manufacturing technology.

\* \* \* \* \*